US012752677B2

(12) United States Patent
Fitzpatrick

(10) Patent No.: US 12,752,677 B2
(45) Date of Patent: Oct. 6, 2026

(54) OCCUPANT SUPPORT

(71) Applicant: Faurecia Automotive Seating, LLC, Auburn Hills, MI (US)

(72) Inventor: Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 115 days.

(21) Appl. No.: 18/754,748

(22) Filed: Jun. 26, 2024

(65) Prior Publication Data

US 2026/0001453 A1 Jan. 1, 2026

(51) Int. Cl.

| | |
|---|---|
| ***B60N 2/12*** | (2006.01) |
| ***B60N 2/01*** | (2006.01) |
| ***B60N 2/16*** | (2006.01) |
| ***B60N 2/18*** | (2006.01) |
| ***B60N 2/90*** | (2018.01) |

(52) U.S. Cl.

CPC ............. *B60N 2/1605* (2013.01); *B60N 2/01* (2013.01); *B60N 2/12* (2013.01); *B60N 2/1803* (2013.01); *B60N 2/1842* (2013.01); *B60N 2/995* (2018.02)

(58) Field of Classification Search

CPC .... B60N 2/1803; B60N 2/1842; B60N 2/995; B60N 2/12; B60N 2/34

See application file for complete search history.

(56) References Cited

U.S. PATENT DOCUMENTS

| | | | | |
|---|---|---|---|---|
| 7,926,876 | B2 * | 4/2011 | Zadai | B66F 3/12 297/DIG. 10 |
| 9,914,371 | B2 | 3/2018 | Fitzpatrick | |
| 12,179,636 | B2 * | 12/2024 | Susko | B60N 2/1842 |
| 12,208,710 | B2 * | 1/2025 | Meredith | B60N 2/1842 |
| 12,325,336 | B2 * | 6/2025 | Runde | B60N 2/10 |
| 2024/0157861 | A1 * | 5/2024 | Scheede | B60N 2/181 |
| 2024/0190300 | A1 * | 6/2024 | Koh | B60N 2/12 |
| 2024/0343166 | A1 * | 10/2024 | Ewald | B60N 2/02253 |
| 2025/0115174 | A1 * | 4/2025 | Chen | B60N 2/4221 |
| 2025/0332965 | A1 * | 10/2025 | Kapusky | B60N 2/181 |

FOREIGN PATENT DOCUMENTS

| | | | | | |
|---|---|---|---|---|---|
| CN | 113547961 | A | * | 10/2021 | B60N 2/22 |
| CN | 117382497 | A | * | 1/2024 | B60N 2/12 |
| FR | 3091216 | A1 | * | 7/2020 | B60N 2/0024 |
| KR | 102360200 | B1 | | 2/2022 | |
| KR | 20250060722 | A | * | 5/2025 | B60N 2/995 |

* cited by examiner

*Primary Examiner* — Timothy J Brindley

(74) *Attorney, Agent, or Firm* — Barnes & Thornburg LLP

(57) ABSTRACT

An occupant support for a vehicle includes a vehicle seat having a seat bottom and a seat back arranged to extend away from the seat bottom. The occupant support further includes a vehicle-seat height-adjustment unit configured to vary a height of the vehicle seat relative to the vehicle and a vehicle-seat longitudinal-adjustment unit configured to vary a longitudinal position of the vehicle seat.

20 Claims, 5 Drawing Sheets

OCCUPANT SUPPORT

BACKGROUND

The present disclosure relates to a seat, and particularly to a seat included in a vehicle. More particularly, the present disclosure relates to a seat having a system used to vary an arrangement of the seat.

SUMMARY

According to the present disclosure, an occupant support for a vehicle includes a vehicle seat having a seat bottom and a seat back arranged to extend away from the seat bottom. The occupant support further includes a vehicle-seat height-adjustment unit configured to vary a height of the vehicle seat relative to the vehicle and a vehicle-seat longitudinal-adjustment unit configured to vary a longitudinal position of the vehicle seat.

In illustrative embodiments, the height-adjustment unit includes a crossbeam coupled to a front end of the seat bottom, a pair of lift arms coupled to the crossbeam, and an arm mover coupled to each of the lift arms. The arm mover is configured to translate the lift arms in a lateral direction relative to the crossbeam toward and away from one another to adjust the seat bottom of the vehicle seat between a normal-use position and a laid-back position. In the normal-use position, the front end of the seat bottom is spaced apart from a floor of the vehicle by a first distance and the seat back extends upwardly away from the seat bottom at a first angle relative to the floor. In the laid-back position, the front end of the seat bottom is spaced apart from the floor of the vehicle by a second distance, greater than the first distance, and the seat back extends away from the seat bottom at a second angle relative to the floor less than the first angle.

In illustrative embodiments, the second distance is at least 80 mm greater than the first distance. In some embodiments, when the vehicle seat is in the laid-back position, the seat bottom of the vehicle seat has an angle of inclination relative to the floor of at least 18 degrees.

In illustrative embodiments, the vehicle-seat longitudinal-adjustment unit includes a pair of fixed rails coupled to the floor of the vehicle and a pair of movable slides coupled between a respective one of the pair of fixed rails and the vehicle-seat height-adjustment unit. The movable slides, the vehicle-seat height-adjustment unit, and the vehicle seat are configured to translate in a longitudinal direction, perpendicular to the lateral direction, relative to the fixed rails between a forward-seating position, in which the front end of the seat bottom is spaced apart from a rear end of the fixed rails by a first distance, and a rearward-seating position, in which the front end of the seat bottom is spaced apart from the rear end of the fixed rails by a second distance less than the first distance.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

Figure 5:
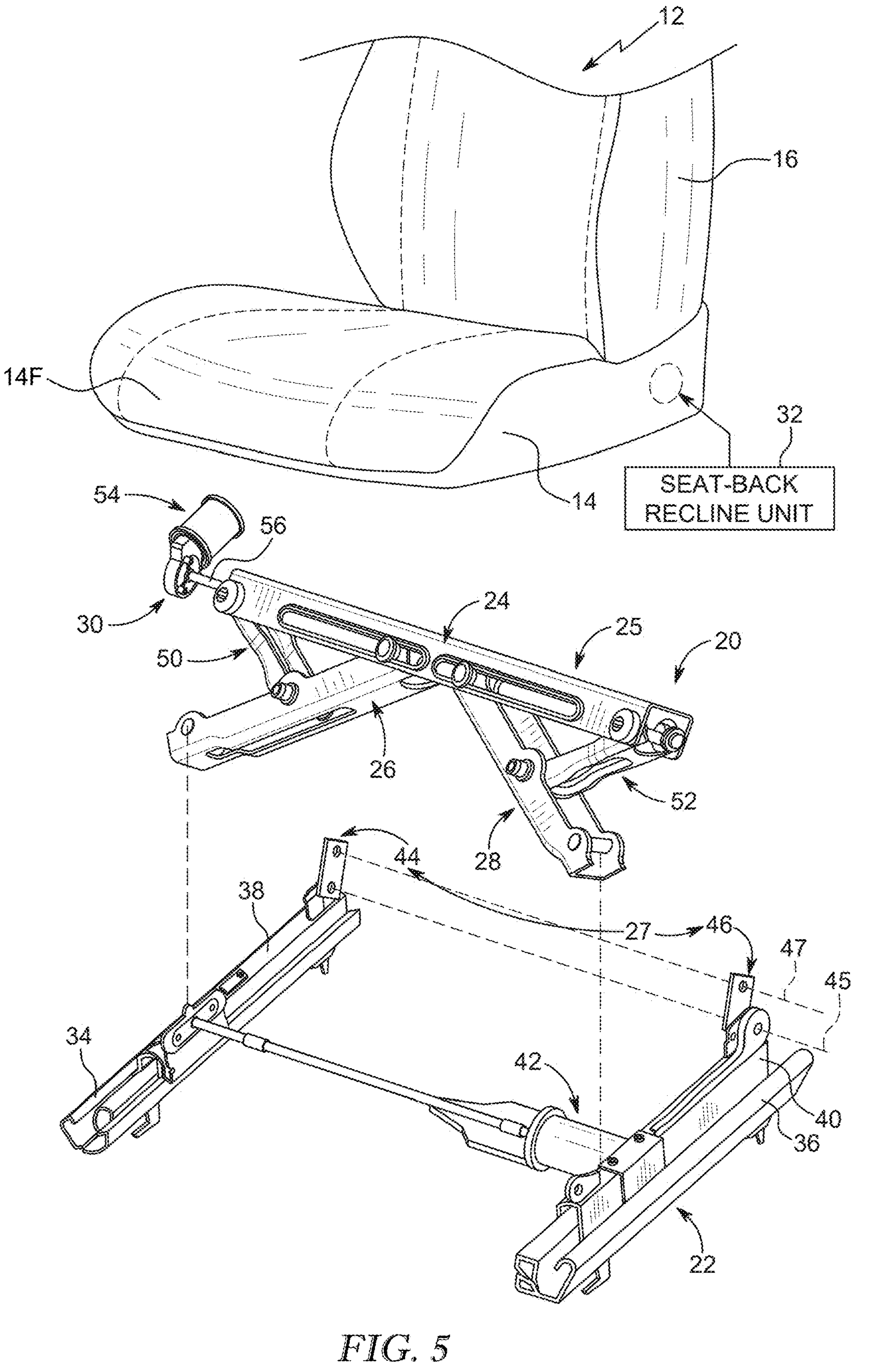
Figure 6:
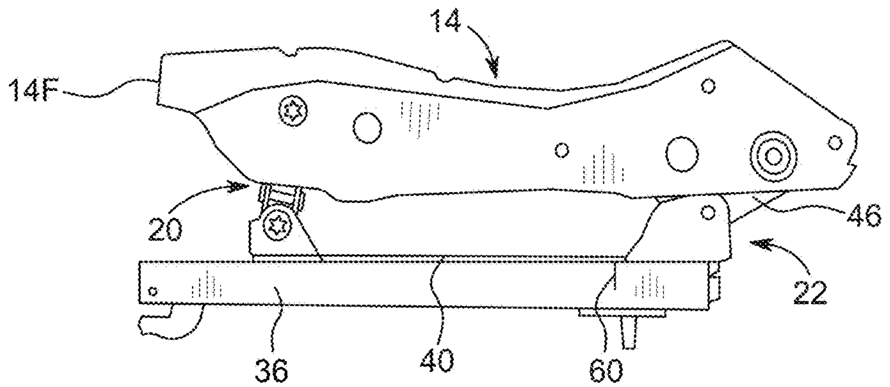
Figure 7:
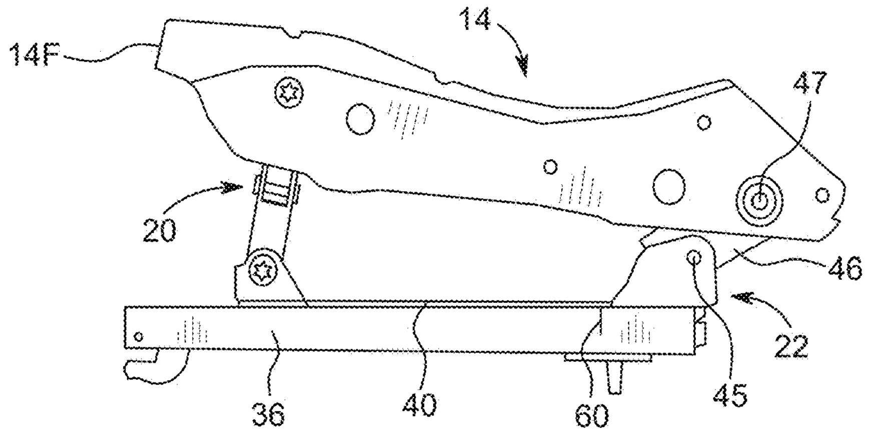
Figure 8:
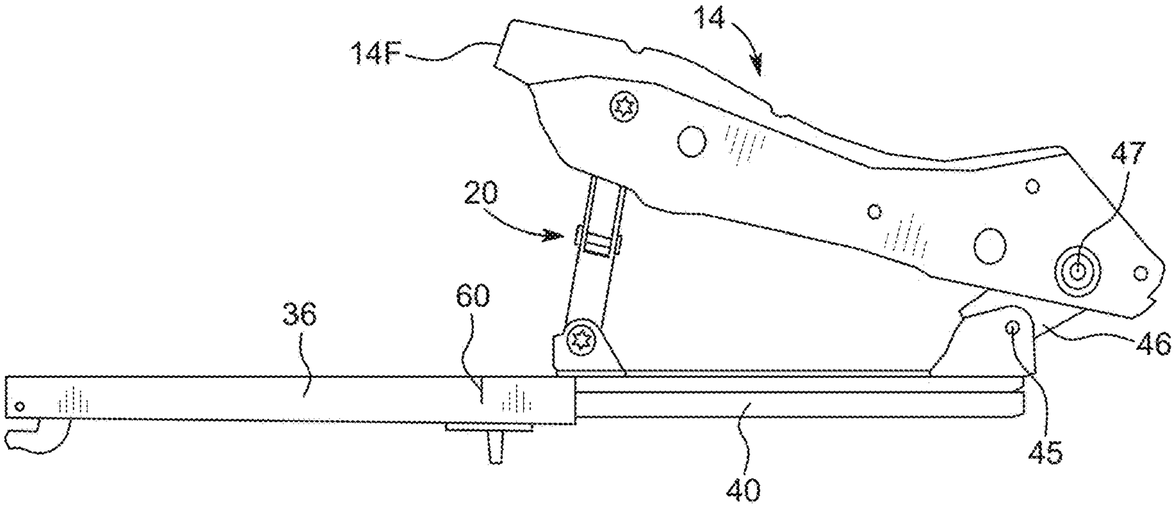
Figure 9:
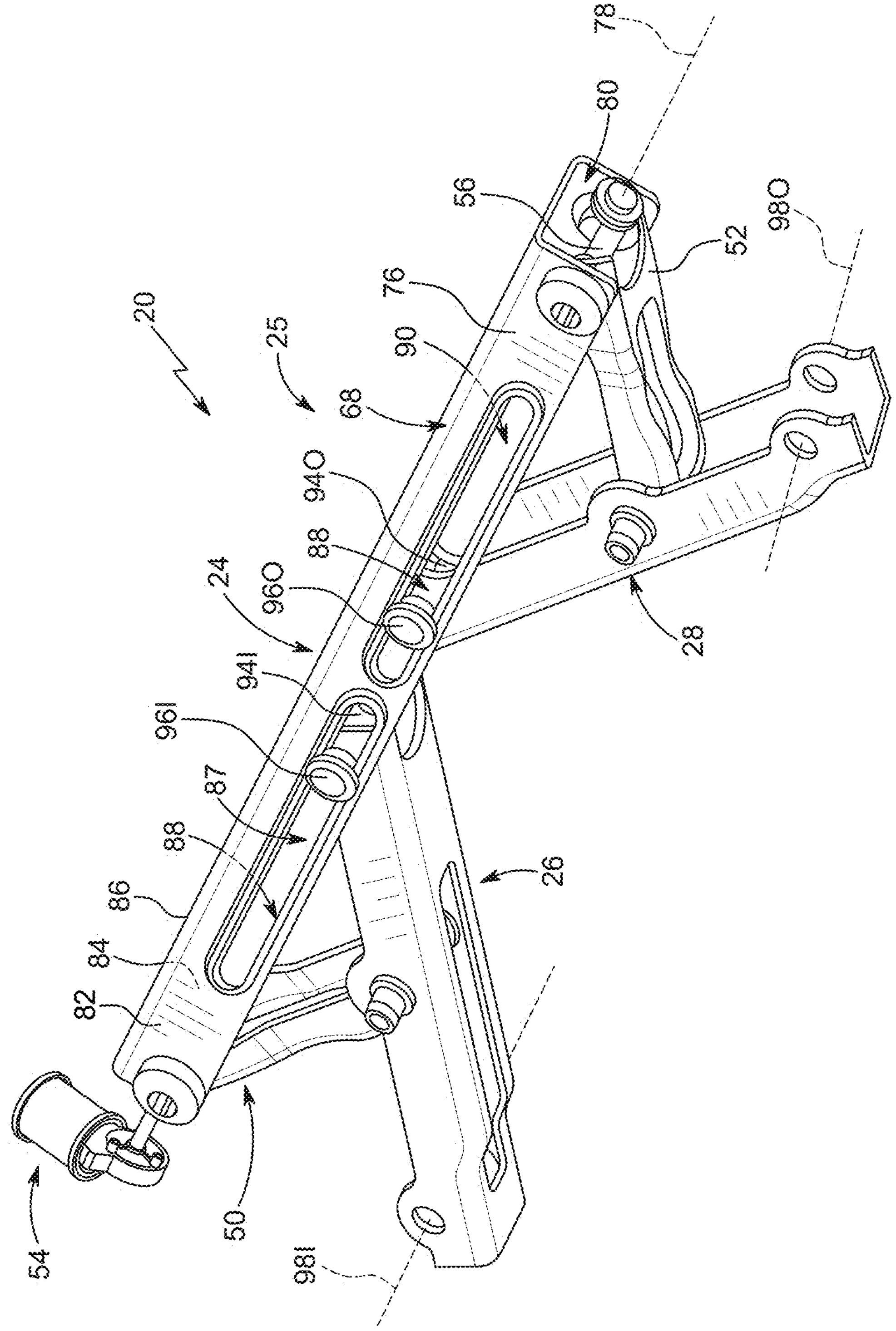
Figure 10:
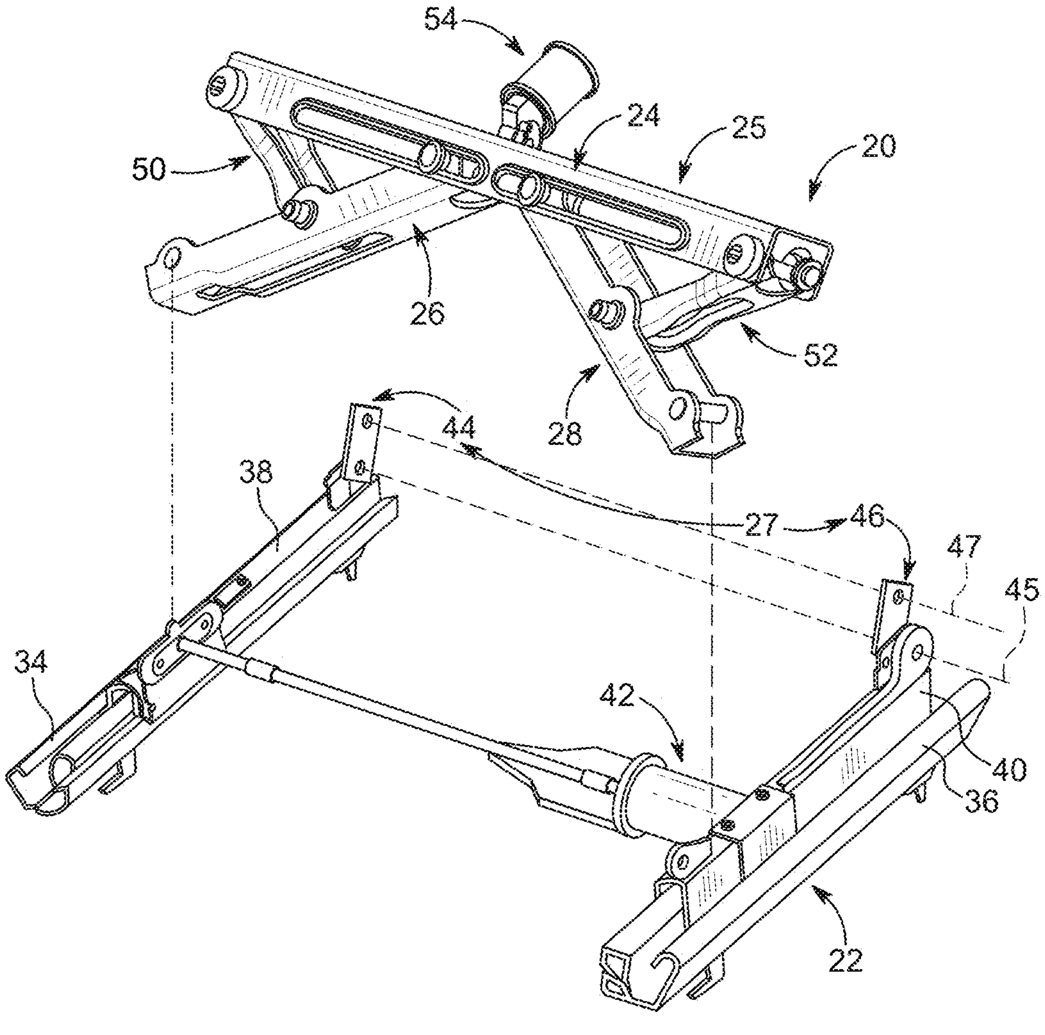

FIG. 5 is an exploded assembly view of the occupant support showing that the height-adjustment unit includes a crossbeam, a pair of lift arms coupled to the crossbeam and the longitudinal-adjustment unit, and a seat mover configured to move each of the lift arms toward and away from one another to raise and lower the front end of the vehicle seat, and showing that the longitudinal-adjustment unit includes a pair of fixed rails and a pair of movable slides coupled to the fixed rails to allow translation of the vehicle seat along the fixed rails between a forward-seating position and a rearward-seating position;

FIG. 6 is a side view of a portion of the occupant support in the normal-use position and in the forward-seating position;

FIG. 7 is a side view of a portion of the occupant support showing the front end of the vehicle seat lifted relative to the floor of the vehicle to a greater height lower than the laid-back position;

FIG. 8 is a side view of a portion of the occupant support showing the front end of the vehicle seat lifted relative to the floor of the vehicle to the laid-back position when the vehicle seat is in the rearward-seating position;

FIG. 9 is a perspective view of the height-adjustment unit showing that the seat mover includes a motor and a screw driven by the motor and coupled to the first and second lift arms to move the first and second lift arms toward and away from one another to raise or lower the vehicle seat; and FIG. 10 is a perspective view of another embodiment of a height-adjustment unit including a motor mounted in a generally central location relative to the height-adjustment unit to locate the motor beneath the vehicle seat.

DETAILED DESCRIPTION

An occupant support 10 for a vehicle 11, in accordance with the present disclosure, is shown in FIGS. 1-4. The occupant support 10 includes a vehicle seat 12 having a seat bottom 14 and a seat back 16 coupled to the seat bottom 14. The seat bottom 14 and the seat back 16 cooperate to provide a seating surface 18 configured to support an occupant thereon.

In the illustrative embodiment, the occupant support 10 further includes a vehicle-seat height-adjustment unit 20 and a vehicle-seat longitudinal-adjustment unit 22 as shown in FIGS. 1-4. The height-adjustment unit 20 and the longitudinal-adjustment unit 22 are configured to move the vehicle seat 12 within the vehicle between multiple positions and configurations. The height-adjustment unit 20 is configured to control and establish a height of the vehicle seat 12 relative to a floor of the vehicle 11. The longitudinal-adjustment 22 is configured to control and establish a longitudinal position of the vehicle seat 12 within the vehicle 11.

The vehicle-seat height-adjustment unit 20 includes a crossbeam 24 coupled to a front end 14F of the seat bottom 14, a pair of lift arms 26, 28 coupled to the crossbeam 24, and an arm mover 30 coupled to each of the lift arms 26, 28.

The crossbeam 24 extends in a lateral direction along the front end 14F of the seat bottom 14. The pair of lift arms 26, 28 each have a first end coupled to the longitudinal-adjustment unit 22 and a second end coupled to the crossbeam 24. The arm mover 30 is coupled to the second end of each lift arm 26, 28 and is configured to translate the second end of the lift arms 26, 28 in a lateral direction relative to the crossbeam 24 toward and away from one another. As the second ends of the lift arms 26, 28 move away from one another in the lateral direction, a height of the front end 14F of the seat bottom 14 from the floor increases. When the second end of the lift arms 26, 28 are positioned closer to one another; the height of the front end of the seat bottom 14 from the floor is relatively smaller.

Figure 1:
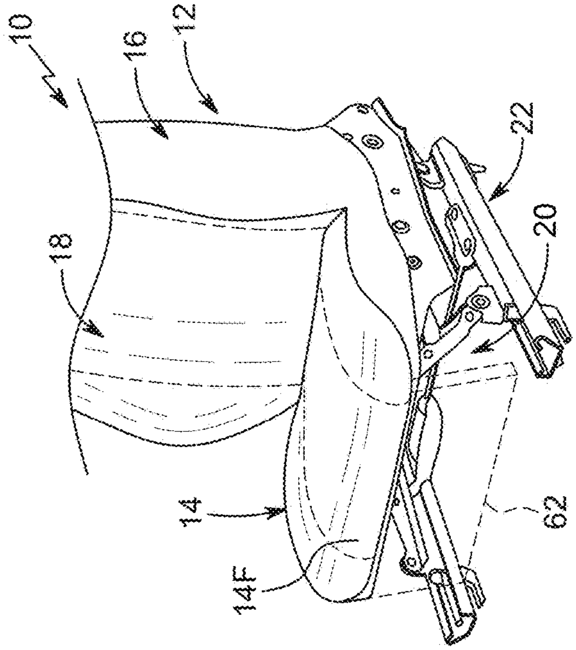
FIG. 1 is a perspective view of an occupant support, in accordance with the present disclosure, including a vehicle seat, a height-adjustment unit configured to vary a height of portions of the vehicle seat relative to a floor of a vehicle, and a longitudinal-adjustment unit configured to vary a longitudinal position of the vehicle seat in the vehicle.
Figure 2:
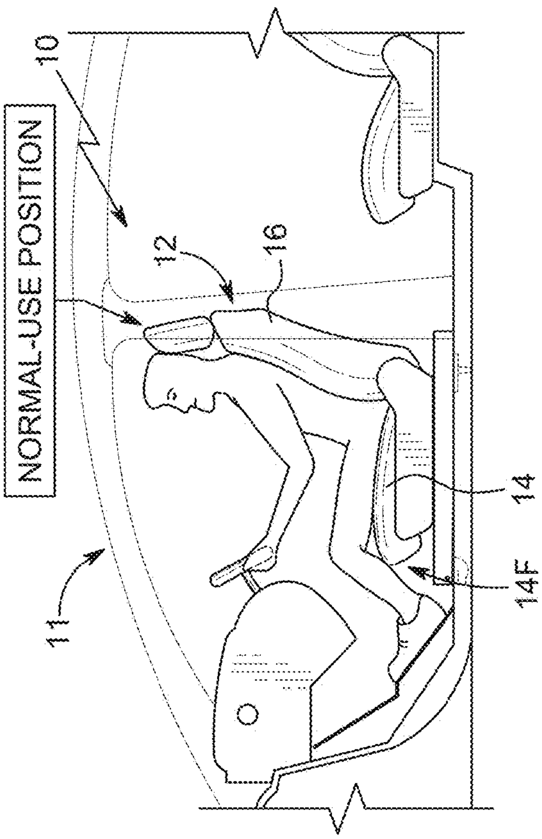
FIG. 2 is a side view of the occupant support located within a vehicle and arranged in a normal-seating position.
Figure 3:
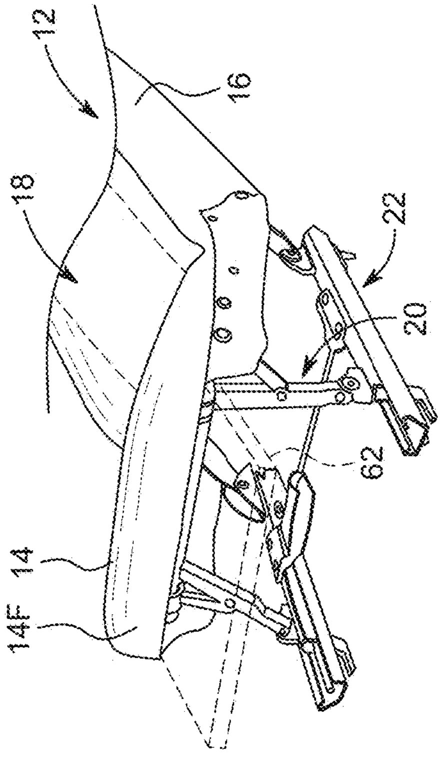
FIG. 3 is a perspective view of the occupant support with a front end of the vehicle seat raised relative to the floor of the vehicle using the height-adjustment unit to a laid-back position.
Figure 4:
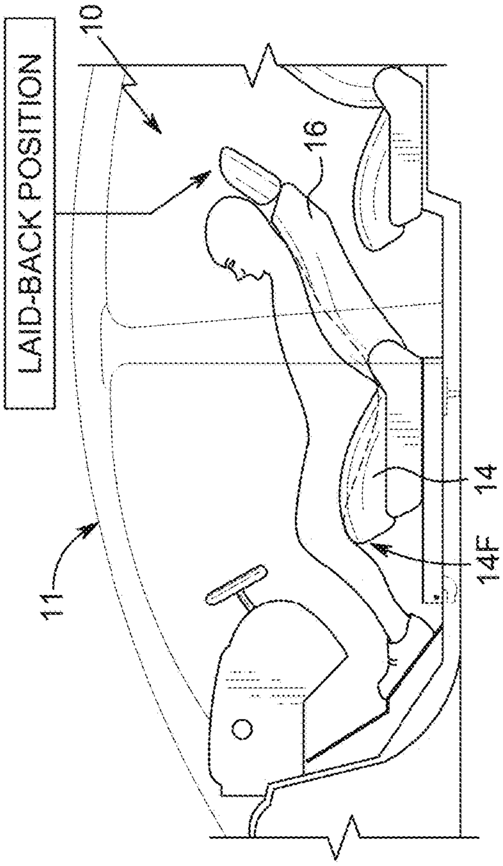
FIG. 4 is a side view of the occupant support in the vehicle showing the occupant support in the laid-back position.

The height-adjustment unit 20 is configured to adjust the seat bottom 14 of the vehicle seat 11 between a normal-use position, as shown in FIGS. 1 and 2, and a laid-back position, as shown in FIGS. 3 and 4. In the normal-use position, the front end 14F of the seat bottom 14 is spaced apart from the floor of the vehicle 11 by a first height and the seat back 16 extends upwardly away from the seat bottom 14 at a first angle relative to the floor. In the laid-back position, the front end 14F of the seat bottom 14 is spaced apart from the floor of the vehicle 11 by a second height, greater than the first height, and the seat back 16 extends away from the seat bottom 14 at a second angle, less than the first angle, relative to the floor. The occupant support 10 may further include a seat-back recline unit 32, including one or more motors and gears, configured to pivot the seat back 16 relative to the seat bottom 14 to adjust the angle of the seat back 16 relative to the floor of the vehicle.

In the illustrative embodiment, the height-adjustment unit 20 is configured to raise the front end 14F of the seat bottom 14 in the laid-back position at least 80 mm greater than the first height when the vehicle seat 12 is in the normal-seating position. Other comparative occupant supports do not have as great a height-adjustment range and, thus, cannot reach the laid-back position shown in FIGS. 3 and 4. Some vehicles include structures, such as a front dash, a steering wheel, or another occupant support, positioned in front and/or above portions of the occupant support 10 thereby further limiting the height-adjustment range of the vehicle seat 12.

The vehicle-seat longitudinal-adjustment unit 22 is configured to adjust the longitudinal position of the vehicle seat 11 away from structures of the vehicle 11 that would typically limit the height-adjustment range of the vehicle seat 12 so that the height-adjustment unit 20 can move the vehicle seat 12 to the laid-back position. The vehicle-seat longitudinal-adjustment unit 22 includes a pair of fixed rails 34, 36 coupled to the floor of the vehicle 11 and a pair of movable slides 38, 40 each coupled between a respective one of the pair of fixed rails 34, 36 and the vehicle-seat height-adjustment unit 20. The fixed rails 34, 36 are coupled in a fixed position relative to the vehicle 11. The movable slides 38, 40 are configured to translate along the fixed slides 34, 36 to change the longitudinal position of the vehicle seat 12 within the vehicle 11.

The movable slides 38, 40, the vehicle-seat height-adjustment unit 20, and the vehicle seat 12 are configured to translate in a longitudinal direction, perpendicular to the lateral direction, relative to the fixed rails 34, 36 between a forward-seating position and a rearward-seating position. A motor 42 is configured to translate the movable slides 38, 40, the vehicle-seat height-adjustment unit 20, and the vehicle seat 12 relative to the rest of the vehicle 11. In the forward-seating position, the front end 14F of the seat bottom 14 is spaced apart from a rear end of the fixed rails 34, 36 by a first distance. In the rearward-seating position, the front end 14F of the seat bottom 14 is spaced apart from the rear end of the fixed rails 34, 36 by a second distance less than the first distance.

The forward-seating position may be the forwardmost position of the vehicle seat 12 within the vehicle. The rearward-seating position may be the rearwardmost position of the vehicle seat 12. The vehicle seat 12 is also positionable and can be locked in place between the forward-seating position and the rearward-seating position in a plurality of intermediate positions.

In the illustrative embodiment, the crossbeam 24, the lift arms 26, 28, and the arm mover 30 are included in a front-end height-adjustment unit 25. The lift arms 26, 28 are coupled to a front end of the movable slides 38, 40. The vehicle-seat height-adjustment unit further includes a rear-end height-adjustment unit 27 coupled to a rear end of the movable slides 38, 40 and the vehicle seat 12.

The rear-end height-adjustment unit 27 includes a first rear-end link 44 extending between and interconnecting the seat bottom 14 and a first movable slide 38 included in the pair of movable slides and a second rear-end link 46 extending between and interconnecting the seat bottom 14 and a second movable slide 38 included in the pair of movable slides. The first and second rear-end links 44, 46 are pivotable about a first axis 45 extending in the lateral direction and about a second axis 47 extending in the lateral direction and spaced apart from the first axis 45.

The vehicle seat 12 may pivot about one or both of the axes 45, 47 as the front end 14F of the seat bottom is raised and lowered by the height-adjustment unit 20. The vehicle seat 12 is configured to pivot in a first direction about the first axis 45 as the vehicle seat 12 moves from the normal-use position to the laid-back position. The first and second links 44, 46 are configured to pivot in the first direction about the second axis 47 as the vehicle seat 12 moves from the normal-use position to the laid-back position.

The front-end height-adjustment unit 25 further includes a pair of link arms 50, 52 each coupled to a respective one of the lift arms 26, 28 and to a respective end of the crossbeam 24 as shown in FIGS. 5 and 9. The link arms 50, 52 control inward and outward movement of the second end of the lift arms 26, 28 in response to movement of the arm mover 30 to raise or lower the front end 14F of the seat bottom 14.

The front end 14F of the seat bottom 14 is located directly beneath a structure, such as a steering wheel or front dash, of the vehicle 11 in the forward-seating position as shown in FIG. 1. The front end 14F of the seat bottom 14 is located rearward of the structure in the rearward-seating position so that the vehicle seat is free to move to the laid-back position without an occupants legs engaging the structure.

In some embodiments, at least one intermediate-seating position between the forward-seating position and the rearward seating position establishes a tilt-limit point 60 as shown in FIGS. 6-8. The tilt limit point 60 is configured to control movement of the vehicle-seat height-adjustment unit from the normal-seating position to the laid-back position. The seat bottom 14 is blocked from moving to the laid-back position when the vehicle seat 11 is between the forward-seating position and the tilt-limit point 60. The seat bottom 14 is movable to the laid-back position when the vehicle seat 11 is between the tilt-limit point 60 and the rearward-seating position. The height-adjustment unit 25 may have a first range of motion when the vehicle seat 11 is between the forward-seating position and the tilt-limit point 60. The height-adjustment unit 25 may have a second range of motion, greater than the first range of motion, when the vehicle seat 11 is between the rearward-seating position and the tilt-limit point 60.

In illustrative embodiments, the occupant support further includes a leg rest 62 coupled to the front end 14F of the seat bottom 14 as shown in FIGS. 1 and 3. The leg rest 62 is configured to pivot relative to the seat bottom 14 from a folded position extending in a downward direction away from the front end 14F of the seat bottom toward the floor of the vehicle 11 and an extended position extending in a forward direction away from the front end 14F of the seat bottom 14 when the vehicle seat 12 is in the laid-back position to support an occupant's legs/calves above the floor of the vehicle 11. The leg rest 62 may be blocked from moving from the folded position to the extended position when the vehicle seat 12 is between the forward-seating position and the tilt-limit point 60. The leg rest 62 is movable to the extended position when the vehicle seat 12 is between the tilt-limit point and the rearward-seating position.

In the illustrative embodiment, the movable slides 38, 40 have a range of motion relative to the fixed rails 34, 36 of at least 200 mm. In some embodiments, the movable slides 38, 40 have a range of motion relative to the fixed rails 34, 36 of at least 210 mm. In some embodiments, the movable slides 38, 40 have a range of motion relative to the fixed rails 34, 36 of at least 220 mm. In some embodiments, the movable slides 38, 40 have a range of motion relative to the fixed rails 34, 36 of at least 230 mm. In some embodiments, the movable slides 38, 40 have a range of motion relative to the fixed rails 34, 36 of at least 240 mm. In some embodiments, the movable slides 38, 40 have a range of motion relative to the fixed rails 34, 36 of at least 250 mm. In some embodiments, the movable slides 38, 40 have a range of motion relative to the fixed rails 34, 36 of at least 260 mm. In some embodiments, the movable slides 38, 40 have a range of motion relative to the fixed rails 34, 36 of at least 270 mm. In some embodiments, the movable slides 38, 40 have a range of motion relative to the fixed rails 34, 36 of at least 280 mm. In some embodiments, the movable slides 38, 40 have a range of motion relative to the fixed rails 34, 36 of at least 290 mm. In some embodiments, the movable slides 38, 40 have a range of motion relative to the fixed rails 34, 36 of at least 300 mm.

In the illustrative embodiment, the vehicle seat 12 has an inclination range of at least 18 degrees relative to a floor of the vehicle 11. In some embodiments, the vehicle seat 12 has an inclination range of at least 15 degrees relative to a floor of the vehicle 11. In some embodiments, the vehicle seat 12 has an inclination range of at least 16 degrees relative to a floor of the vehicle 11. In some embodiments, the vehicle seat 12 has an inclination range of at least 17 degrees relative to a floor of the vehicle 11. In some embodiments, the vehicle seat 12 has an inclination range of at least 19 degrees relative to a floor of the vehicle 11. In some embodiments, the vehicle seat 12 has an inclination range of at least 20 degrees relative to a floor of the vehicle 11.

In order to achieve the inclination range, the height-adjustment unit 20 is configured to move the front end 14F of the seat bottom in a height adjustment range of at least 60 mm. In some embodiments, the height-adjustment unit 20 is configured to move the front end 14F of the seat bottom in a height adjustment range of at least 70 mm. In some embodiments, the height-adjustment unit 20 is configured to move the front end 14F of the seat bottom in a height adjustment range of at least 80 mm. In some embodiments, the height-adjustment unit 20 is configured to move the front end 14F of the seat bottom in a height adjustment range of at least 90 mm. In some embodiments, the height-adjustment unit 20 is configured to move the front end 14F of the seat bottom in a height adjustment range of at least 100 mm.

The arm mover 30 includes a motor 54 and a screw 56. Illustratively, the motor 54 is a radial motor mounted to a lateral side of the seat bottom 14 and the arm mover 30. The motor 54 is configured to rotate the screw 56 about a screw axis 78 and moves the second ends of the lift arms 26, 28 in response to this movement. In some embodiments, the motor 54 used to drive movement of the screw 56 can be mounted in a generally central location relative to the height-adjustment unit 20 as shown in FIG. 10.

The screw 56 is housed within a crossbeam body 76 included in the crossbeam 24 as shown in FIG. 9. The screw 56 is configured to transmit mechanical motion between the motor 54 and lift arms 26, 28 to drive the lift arms 26, 28. The crossbeam body 76 supports the screw 56 and guides movement of the lift arms 26, 28.

The screw 56 extends along the screw axis 78 and interconnects link arms 50, 52 as shown in FIG. 9. The screw 56 is received in a screw receiver channel 80 formed in crossbeam body 76. The screw 56 is threaded and meshed with each lift arm 26, 28. The screw 56 is connected to the motor 54 and is configured to be rotated about screw axis 78 by the motor 54.

The crossbeam body 76 includes a first side wall 82, a second side wall 84 spaced apart from the first side wall 82, and a top wall 86 interconnecting first and second side walls 82, 84 as shown in FIG. 9. The crossbeam body 76 is U-shaped and formed to include downwardly opening screw receiver channel 80. The screw receiver channel 80 extends along the screw axis 78 and receives the screw 56.

The side wall 82 is formed to include guide slots 87, 88 as shown in FIG. 9. The side wall 84 is formed to include additional guide slots 89, 90 aligned with guide slots 87, 88 formed in first side wall 82. Guide slots 87, 88, 89, 90 extend axially relative to the screw axis 78 along a portion of the crossbeam body 76. Guide slots 87, 88, 89, 90 receive a portion of each lift arm 26, 28 and control relative movement between each lift arm 26, 28 and the crossbeam body 76. Each lift arm 26, 28 is configured to move away from one another to cause the front end 14F of the seat bottom 14 to raise and to move toward one another to cause the front end 14F of the seat bottom 14 to lower.

The lift arm 26 is coupled to the crossbeam body 76 at an upper end and coupled to the link arm 50 at a midsection as shown in FIG. 9. The lift arm 26 includes a screw receiver 94I and one or more guide pins 96I at the upper end of the lift arm 26. The screw receiver 94I is meshed with the screw 56. Rotation of the screw 56 causes the screw receiver 94I to move axially along the screw axis 78. The guide pins 96I extend into guide slots 87, 89 so that the upper end of the lift arm 26 is limited to movement along the screw axis 78. The lift arm 26 is configured to pivot about a first lift-arm pivot axis 98I when the lift arm 26 is driven by the screw 56 to cause the front end 14F to raise and lower.

The lift arm 28 includes a screw receiver 940 and one or more guide pins 960 as shown in FIG. 9. The lift arm 28 is substantially similar to the lift arm 26 and, as such, only the lift arm 26 is discussed in detail, but it should be noted that the operation and function of lift arm 28 is the same as lift arm 26 except that the lift arm 28 moves in opposite directions from lift arm 26.

The following numbered clauses include embodiments that are contemplated and non-limiting:

Clause 1. An occupant support for a vehicle includes a vehicle seat including a seat bottom and a seat back arranged to extend away from the seat bottom.

Clause 2. The occupant support of clause 1, any other suitable clause or any suitable combination of clauses, including a vehicle-seat height-adjustment unit including a crossbeam coupled to a front end of the seat bottom, a pair of lift arms coupled to the crossbeam, and an arm mover coupled to each of the lift arms.

Clause 3. The occupant support of clause 2, any other suitable clause or any suitable combination of clauses, wherein the arm mover is configured to translate the lift arms in a lateral direction relative to the crossbeam toward and away from one another to adjust the seat bottom of the vehicle seat between a normal-use position in which the front end of the seat bottom is spaced apart from a floor of the vehicle by a first height and the seat back extends upwardly away from the seat bottom at a first angle relative to the floor, and a laid-back position, in which the front end of the seat bottom is spaced apart from the floor of the vehicle by a second height greater than the first height and the seat back extends away from the seat bottom at a second angle relative to the floor less than the first angle.

Clause 4. The occupant support of clause 3, any other suitable clause or any suitable combination of clauses, including a vehicle-seat longitudinal-adjustment unit including a pair of fixed rails coupled to the floor of the vehicle and a pair of movable slides coupled between a respective one of the pair of fixed rails and the vehicle-seat height-adjustment unit.

Clause 5. The occupant support of clause 4, any other suitable clause or any suitable combination of clauses, wherein the movable slides, the vehicle-seat height-adjustment unit, and the vehicle seat are configured to translate in a longitudinal direction, perpendicular to the lateral direction, relative to the fixed rails between a forward-seating position, in which the front end of the seat bottom is spaced apart from a rear end of the fixed rails by a first distance, and a rearward-seating position, in which the front end of the seat bottom is spaced apart from the rear end of the fixed rails by a second distance less than the first distance.

Clause 6. The occupant support of clause 5, any other suitable clause or any suitable combination of clauses, wherein the crossbeam, the lift arms, and the arm mover are included in a front-end height-adjustment unit and the vehicle-seat height-adjustment unit further includes a rear-end height-adjustment unit coupled to a rear end of the movable slides and the vehicle seat.

Clause 7. The occupant support of clause 6, any other suitable clause or any suitable combination of clauses, wherein the rear-end height-adjustment unit includes a first rear-end link extending between and interconnecting the seat bottom and a first movable slide included in the pair of movable slides and a second rear-end link extending between and interconnecting the seat bottom and a second movable slide included in the pair of movable slides.

Clause 8. The occupant support of clause 7, any other suitable clause or any suitable combination of clauses, wherein the first and second rear-end links are pivotable about a first axis extending in the lateral direction and about a second axis extending in the lateral direction and spaced apart from the first axis.

Clause 9. The occupant support of clause 8, any other suitable clause or any suitable combination of clauses, wherein the vehicle seat is configured to pivot in a first direction about the first axis as the vehicle seat moves from the normal-use position to the laid-back position.

Clause 10. The occupant support of clause 9, any other suitable clause or any suitable combination of clauses, wherein the first and second links are configured to pivot in the first direction about the second axis as the vehicle seat moves from the normal-use position to the laid-back position.

Clause 11. The occupant support of clause 6, any other suitable clause or any suitable combination of clauses, wherein the front-end height-adjustment unit further includes a pair of link arms each coupled to a respective one of the lift arms and to a respective end of the crossbeam to control inward and outward movement of an end of each lift arm relative to one another as the arm mover adjusts the lift arms.

Clause 12. The occupant support of clause 5, any other suitable clause or any suitable combination of clauses, wherein the front end of the vehicle seat is located directly beneath a structure of the vehicle in the forward-seating position and the front end of the vehicle seat is located rearward of the structure in the rearward-seating position so that the vehicle seat is free to move to the laid-back position without an occupants legs engaging the structure.

Clause 13. The occupant support of clause 5, any other suitable clause or any suitable combination of clauses, wherein the movable slide, the vehicle-seat height-adjustment unit, and the vehicle seat are positionable between the forward-seating position and the rearward-seating position in a plurality of intermediate-seating positions, and at least one intermediate-seating position establishes a tilt-limit point configured to control movement of the vehicle-seat height-adjustment unit from the normal-seating position to the laid-back position.

Clause 14. The occupant support of clause 13, any other suitable clause or any suitable combination of clauses, wherein the seat bottom is blocked from moving to the laid-back position when the vehicle seat is between the forward-seating position and the tilt-limit point and is movable to the laid-back position when the vehicle seat is between the tilt-limit point and the rearward-seating position.

Clause 15. The occupant support of clause 14, any other suitable clause or any suitable combination of clauses, further comprising a leg rest coupled to the front end of the seat bottom for pivotable movement relative to the seat bottom from folded position extending in a downward direction away from the front end of the seat bottom toward the floor and an extended position extending in a forward direction away from the front end of the seat bottom when the vehicle seat is in the laid-back position to support an occupant's calves above the floor of the vehicle.

Clause 16. The occupant support of clause 15, any other suitable clause or any suitable combination of clauses, wherein the leg rest is blocked from moving from the folded position to the extended position when the vehicle seat is between the forward-seating position and the tilt-limit point and is movable to the extended position when the vehicle seat is between the tilt-limit point and the rearward-seating position.

Clause 17. The occupant support of clause 5, any other suitable clause or any suitable combination of clauses, wherein the movable slides have a longitudinal range of motion relative to the fixed rails of at least 200 mm.

Clause 18. The occupant support of clause 17, any other suitable clause or any suitable combination of clauses, wherein the vehicle seat has an inclination range of at least 18 degrees relative to a floor of the vehicle and a front end height-adjustment range of motion of at least 80 mm.

Clause 19. An occupant support for a vehicle, the occupant support comprising a vehicle seat.

Clause 20. The occupant support of clause 19, any other suitable clause or any suitable combination of clauses, including a vehicle-seat height-adjustment unit.

Clause 21. The occupant support of clause 20, any other suitable clause or any suitable combination of clauses, including a vehicle-seat longitudinal-adjustment unit.

Clause 22. The occupant support of clause 21, any other suitable clause or any suitable combination of clauses, wherein the vehicle seat has a height-adjustment range of motion of at least 80 mm and a longitudinal range of motion of at least 200 mm so that the vehicle seat has an inclination range of at least 18 degrees relative to a floor of the vehicle.

Clause 23. The occupant support of clause 22, any other suitable clause or any suitable combination of clauses, the vehicle-seat height-adjustment unit including a crossbeam coupled to a front end of the vehicle seat, a pair of lift arms coupled to the crossbeam, and an arm mover coupled to each of the lift arms and configured to translate the lift arms in a lateral direction relative to the crossbeam toward and away from one another to adjust a height of a front end of the vehicle seat of the vehicle seat from a floor of the vehicle.

Clause 24. The occupant support of clause 23, any other suitable clause or any suitable combination of clauses, the vehicle-seat longitudinal-adjustment unit including a pair of fixed rails coupled to the floor of the vehicle and a pair of movable slides coupled between a respective one of the pair of fixed rails and the vehicle-seat height-adjustment unit to adjust a longitudinal position of the vehicle seat relative to the fixed rails, Clause 25. The occupant support of clause 24, any other suitable clause or any suitable combination of clauses, wherein the crossbeam, the lift arms, and the arm mover are included in a front-end height-adjustment unit and the vehicle-seat height-adjustment unit further includes a rear-end height-adjustment unit coupled to a rear end of the movable slides and the vehicle seat, the rear-end height-adjustment unit comprising a first rear-end link extending between and interconnecting the vehicle seat and a first movable slide included in the pair of movable slides and a second rear-end link extending between and interconnecting the vehicle seat and a second movable slide included in the pair of movable slides.

Clause 26. The occupant support of clause 25, any other suitable clause or any suitable combination of clauses, wherein the first and second rear-end links are pivotable about a first axis extending in the lateral direction and about a second axis extending in the lateral direction and spaced apart from the first axis, wherein the vehicle seat is configured to pivot in a first direction about the first axis as the vehicle seat moves from a normal-use position to a laid-back position, and wherein the first and second links are configured to pivot in the first direction about the second axis as the vehicle seat moves from the normal-use position to the laid-back position.

Clause 27. The occupant support of clause 26, any other suitable clause or any suitable combination of clauses, wherein the front-end height-adjustment unit further includes a pair of link arms each coupled to a respective one of the lift arms and to a respective end of the crossbeam.

Clause 28. The occupant support of clause 27, any other suitable clause or any suitable combination of clauses, wherein the front end of the vehicle seat is located directly beneath a structure of the vehicle in a forward-seating position and the front end of the vehicle seat is located rearward of the structure in a rearward-seating position so that the vehicle seat is free to move to the laid-back position without an occupants legs engaging the structure.

Clause 29. The occupant support of clause 28, any other suitable clause or any suitable combination of clauses, wherein the movable slides, the vehicle-seat height-adjustment unit, and the vehicle seat are positionable in a plurality of intermediate-seating positions between a forward-seating position and a rearward-seating position, and at least one intermediate-seating position establishes a tilt-limit point configured to control movement of the vehicle-seat height-adjustment unit from a normal-seating position to a laid-back position based on the location of the vehicle seat relative to the tilt-limit point.

Clause 30. The occupant support of clause 29, any other suitable clause or any suitable combination of clauses, wherein the vehicle seat is blocked from moving to the laid-back position when the vehicle seat is between the forward-seating position and the tilt-limit point and is movable to the laid-back position when the vehicle seat is between the tilt-limit point and the rearward-seating position.

Clause 31. The occupant support of clause 30, any other suitable clause or any suitable combination of clauses, further comprising a leg rest coupled to the front end of the vehicle seat for pivotable movement relative to the vehicle seat from folded position extending in a downward direction away from the front end of the vehicle seat toward the floor and an extended position extending in a forward direction away from the front end of the vehicle seat when the vehicle seat is in the laid-back position to support an occupant's calves above the floor of the vehicle.

Clause 32. The occupant support of clause 31, any other suitable clause or any suitable combination of clauses, wherein the leg rest is blocked from moving from the folded position to the extended position when the vehicle seat is between the forward-seating position and the tilt-limit point and is movable to the extended position when the vehicle seat is between the tilt-limit point and the rearward-seating position.

The invention claimed is:

1. An occupant support for a vehicle, the occupant support comprising:

a vehicle seat including a seat bottom and a seat back arranged to extend away from the seat bottom, a vehicle-seat height-adjustment unit including a crossbeam coupled to a front end of the seat bottom, a pair of lift arms coupled to the crossbeam, and an arm mover coupled to each of the lift arms and configured to translate the lift arms in a lateral direction relative to the crossbeam toward and away from one another to adjust the seat bottom of the vehicle seat between a normal-use position in which the front end of the seat bottom is spaced apart from a floor of the vehicle by a first height and the seat back extends upwardly away from the seat bottom at a first angle relative to the floor, and a laid-back position, in which the front end of the seat bottom is spaced apart from the floor of the vehicle by a second height greater than the first height and the seat back extends away from the seat bottom at a second angle relative to the floor less than the first angle, and a vehicle-seat longitudinal-adjustment unit including a pair of fixed rails coupled to the floor of the vehicle and a pair of movable slides coupled between a respective one of the pair of fixed rails and the vehicle-seat height-adjustment unit, wherein the movable slides, the vehicle-seat height-adjustment unit, and the vehicle seat are configured to translate in a longitudinal direction, perpendicular to the lateral direction, relative to the fixed rails between a forward-seating position, in which the front end of the seat bottom is spaced apart from a rear end of the fixed rails by a first distance, and a rearward-seating position, in which the front end of the seat bottom is spaced apart from the rear end of the fixed rails by a second distance less than the first distance, wherein the movable slide, the vehicle-seat height-adjustment unit, and the vehicle seat are positionable between the forward-seating position and the rearward-seating position in a plurality of intermediate-seating positions, and at least one intermediate-seating position establishes a tilt-limit point configured to control movement of the vehicle-seat height-adjustment unit from the normal-seating position to the laid-back position, and wherein the seat bottom is blocked from moving to the laid-back position when the vehicle seat is between the forward-seating position and the tilt-limit point and is movable to the laid-back position when the vehicle seat is between the tilt-limit point and the rearward-seating position.

2. The occupant support of claim 1, wherein the crossbeam, the lift arms, and the arm mover are included in a front-end height-adjustment unit and the vehicle-seat height-adjustment unit further includes a rear-end height-adjustment unit coupled to a rear end of the movable slides and the vehicle seat, the rear-end height-adjustment unit comprising a first rear-end link extending between and interconnecting the seat bottom and a first movable slide included in the pair of movable slides and a second rear-end link extending between and interconnecting the seat bottom and a second movable slide included in the pair of movable slides.

3. The occupant support of claim 2, wherein the first and second rear-end links are pivotable about a first axis extending in the lateral direction and about a second axis extending in the lateral direction and spaced apart from the first axis, wherein the vehicle seat is configured to pivot in a first direction about the first axis as the vehicle seat moves from the normal-use position to the laid-back position, and wherein the first and second links are configured to pivot in the first direction about the second axis as the vehicle seat moves from the normal-use position to the laid-back position.

4. The occupant support of claim 2, wherein the front-end height-adjustment unit further includes a pair of link arms each coupled to a respective one of the lift arms and to a respective end of the crossbeam to control inward and outward movement of an end of each lift arm relative to one another as the arm mover adjusts the lift arms.

5. The occupant support of claim 1, wherein the front end of the vehicle seat is located directly beneath a structure of the vehicle in the forward-seating position and the front end of the vehicle seat is located rearward of the structure in the rearward-seating position so that the vehicle seat is free to move to the laid-back position without an occupants legs engaging the structure.

6. The occupant support of claim 1, further comprising a leg rest coupled to the front end of the seat bottom for pivotable movement relative to the seat bottom from folded position extending in a downward direction away from the front end of the seat bottom toward the floor and an extended position extending in a forward direction away from the front end of the seat bottom when the vehicle seat is in the laid-back position to support an occupant's calves above the floor of the vehicle.

7. The occupant support of claim 6, wherein the leg rest is blocked from moving from the folded position to the extended position when the vehicle seat is between the forward-seating position and the tilt-limit point and is movable to the extended position when the vehicle seat is between the tilt-limit point and the rearward-seating position.

8. The occupant support of claim 1, wherein the movable slides have a longitudinal range of motion relative to the fixed rails of at least 200 mm.

9. The occupant support of claim 1, wherein the vehicle seat has an inclination range of at least 18 degrees relative to a floor of the vehicle and a front end height-adjustment range of motion of at least 80 mm.

10. An occupant support for a vehicle, the occupant support comprising:

a vehicle seat, a vehicle-seat height-adjustment unit including a crossbeam coupled to a front end of the vehicle seat, a pair of lift arms coupled to the crossbeam, and an arm mover coupled to each of the lift arms and configured to translate the lift arms in a lateral direction relative to the crossbeam toward and away from one another to adjust a height of a front end of the vehicle seat of the vehicle seat from a floor of the vehicle, and a vehicle-seat longitudinal-adjustment unit including a pair of fixed rails coupled to the floor of the vehicle and a pair of movable slides coupled between a respective one of the pair of fixed rails and the vehicle-seat height-adjustment unit to adjust a longitudinal position of the vehicle seat relative to the fixed rails, wherein the vehicle seat has a height-adjustment range of motion of at least 80 mm and a longitudinal range of motion of at least 200 mm so that the vehicle seat has an inclination range of at least 18 degrees relative to a floor of the vehicle, wherein the movable slides, the vehicle-seat height-adjustment unit, and the vehicle seat are positionable in a plurality of intermediate-seating positions between a forward-seating position and a rearward-seating position, and at least one intermediate-seating position establishes a tilt-limit point configured to control movement of the vehicle-seat height-adjustment unit from a normal-seating position to a laid-back position based on the location of the vehicle seat relative to the tilt-limit point, and wherein the vehicle seat is blocked from moving to the laid-back position when the vehicle seat is between the forward-seating position and the tilt-limit point and is movable to the laid-back position when the vehicle seat is between the tilt-limit point and the rearward-seating position.

11. The occupant support of claim 10, wherein the crossbeam, the lift arms, and the arm mover are included in a front-end height-adjustment unit and the vehicle-seat height-adjustment unit further includes a rear-end height-adjustment unit coupled to a rear end of the movable slides and the vehicle seat, the rear-end height-adjustment unit comprising a first rear-end link extending between and interconnecting the vehicle seat and a first movable slide included in the pair of movable slides and a second rear-end link extending between and interconnecting the vehicle seat and a second movable slide included in the pair of movable slides.

12. The occupant support of claim 11, wherein the first and second rear-end links are pivotable about a first axis extending in the lateral direction and about a second axis extending in the lateral direction and spaced apart from the first axis, wherein the vehicle seat is configured to pivot in a first direction about the first axis as the vehicle seat moves from a normal-use position to a laid-back position, and wherein the first and second links are configured to pivot in the first direction about the second axis as the vehicle seat moves from the normal-use position to the laid-back position.

13. The occupant support of claim 11, wherein the front-end height-adjustment unit further includes a pair of link arms each coupled to a respective one of the lift arms and to a respective end of the crossbeam.

14. The occupant support of claim 13, wherein the front end of the vehicle seat is located directly beneath a structure of the vehicle in a forward-seating position and the front end of the vehicle seat is located rearward of the structure in a rearward-seating position so that the vehicle seat is free to move to the laid-back position without an occupants legs engaging the structure.

15. The occupant support of claim 10, further comprising a leg rest coupled to the front end of the vehicle seat for pivotable movement relative to the vehicle seat from folded position extending in a downward direction away from the front end of the vehicle seat toward the floor and an extended position extending in a forward direction away from the front end of the vehicle seat when the vehicle seat is in the laid-back position to support an occupant's calves above the floor of the vehicle.

16. The occupant support of claim 15, wherein the leg rest is blocked from moving from the folded position to the extended position when the vehicle seat is between the forward-seating position and the tilt-limit point and is movable to the extended position when the vehicle seat is between the tilt-limit point and the rearward-seating position.

17. An occupant support for a vehicle, the occupant support comprising:

a vehicle seat, a vehicle-seat height-adjustment unit including a crossbeam coupled to a front end of the vehicle seat, a pair of lift arms coupled to the crossbeam, and an arm mover coupled to each of the lift arms and configured to translate the lift arms in a lateral direction relative to the crossbeam toward and away from one another to adjust a height of a front end of the vehicle seat of the vehicle seat from a floor of the vehicle, and a vehicle-seat longitudinal-adjustment unit including a pair of fixed rails coupled to the floor of the vehicle and a pair of movable slides coupled between a respective one of the pair of fixed rails and the vehicle-seat height-adjustment unit to adjust a longitudinal position of the vehicle seat relative to the fixed rails, wherein the movable slides, the vehicle-seat height-adjustment unit, and the vehicle seat are positionable in a plurality of intermediate-seating positions between a forward-seating position and a rearward-seating position, and at least one intermediate-seating position establishes a tilt-limit point configured to control movement of the vehicle-seat height-adjustment unit from a normal-seating position to a laid-back position based on the location of the vehicle seat relative to the tilt-limit point, and wherein the vehicle seat is blocked from moving to the laid-back position when the vehicle seat is between the forward-seating position and the tilt-limit point and is movable to the laid-back position when the vehicle seat is between the tilt-limit point and the rearward-seating position.

18. The occupant support of claim 17, wherein the crossbeam, the lift arms, and the arm mover are included in a front-end height-adjustment unit and the vehicle-seat height-adjustment unit further includes a rear-end height-adjustment unit coupled to a rear end of the movable slides and the vehicle seat, the rear-end height-adjustment unit comprising a first rear-end link extending between and interconnecting the vehicle seat and a first movable slide included in the pair of movable slides and a second rear-end link extending between and interconnecting the vehicle seat and a second movable slide included in the pair of movable slides.

19. The occupant support of claim 18, wherein the first and second rear-end links are pivotable about a first axis extending in the lateral direction and about a second axis extending in the lateral direction and spaced apart from the first axis, wherein the vehicle seat is configured to pivot in a first direction about the first axis as the vehicle seat moves from a normal-use position to a laid-back position, and wherein the first and second links are configured to pivot in the first direction about the second axis as the vehicle seat moves from the normal-use position to the laid-back position.

20. The occupant support of claim 18, wherein the front-end height-adjustment unit further includes a pair of link arms each coupled to a respective one of the lift arms and to a respective end of the crossbeam.

* * * * *